(12) United States Patent
Ohnishi

(10) Patent No.: US 8,094,999 B2
(45) Date of Patent: Jan. 10, 2012

(54) IMAGING APPARATUS AND IMAGE SYNTHESIS METHOD

(75) Inventor: Naoyuki Ohnishi, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/702,749

(22) Filed: Feb. 9, 2010

(65) Prior Publication Data

US 2010/0215354 A1  Aug. 26, 2010

(30) Foreign Application Priority Data

Feb. 24, 2009  (JP) .................................. 2009-040359

(51) Int. Cl.
*G03B 17/00* (2006.01)
*G02B 7/28* (2006.01)
(52) U.S. Cl. .......................................... 396/113; 396/79
(58) Field of Classification Search .................... 396/79, 396/113

See application file for complete search history.

(56) References Cited

U.S. PATENT DOCUMENTS

| | | | | |
|---|---|---|---|---|
| 7,732,744 | B2* | 6/2010 | Utagawa | 250/208.1 |
| 2007/0206940 | A1* | 9/2007 | Kusaka | 396/128 |
| 2007/0252074 | A1 | 11/2007 | Ng et al. | |
| 2007/0268541 | A1* | 11/2007 | Fujita et al. | 359/201 |
| 2008/0302947 | A1 | 12/2008 | Utagawa | |
| 2009/0140131 | A1 | 6/2009 | Utagawa | |
| 2009/0148147 | A1* | 6/2009 | Fujii et al. | 396/128 |
| 2010/0110272 | A1* | 5/2010 | Sugawara | 348/341 |
| 2010/0232776 | A1* | 9/2010 | Ohnishi | 396/104 |

FOREIGN PATENT DOCUMENTS

| | | |
|---|---|---|
| JP | A-02-300730 | 12/1990 |
| JP | A-07-318785 | 12/1995 |
| JP | A-2007-004471 | 1/2007 |
| JP | A-2008-256826 | 10/2008 |
| JP | A-2008-304808 | 12/2008 |

OTHER PUBLICATIONS

Feb. 1, 2011 Translation of Notification of Reasons for Refusal issued in Japanese Patent Application No. 2009-040359.

* cited by examiner

*Primary Examiner* — Rodney Fuller
(74) *Attorney, Agent, or Firm* — Oliff & Berridge, PLC

(57) ABSTRACT

An imaging apparatus comprising: a light receiving element having a micro lens array provided with a plurality of micro lenses 111*a* arranged two-dimensionally, and a plurality of photoelectric conversion elements 112*a* provided for the plurality of micro lenses, and outputting a light receiving signal obtained by receiving a light beam from an optical system via the micro lens array; a detector 152 that detects a shift amount of image plane by the optical system for a plurality of focus detecting positions set at a plurality of positions in the image plane by the optical system; and a controller 160 that determines a focus adjusting range for the optical system based on the shift amount detected for each of the plurality of focus detecting positions, and obtains the light receiving signal at each of different positions within the focus adjusting range with the light receiving element.

9 Claims, 13 Drawing Sheets

IMAGING APPARATUS AND IMAGE SYNTHESIS METHOD

BACKGROUND OF THE INVENTION

1. Field of the Invention

The present invention relates to an imaging apparatus and an image synthesis method.

2. Description of the Related Art

Conventionally known is an imaging apparatus taking an image of a subject by using an image pickup device. As available for such an imaging apparatus, an imaging synthesis technique is disclosed in which an image is synthesized in focuses on a plurality of image planes based on information regarding light incident from an optical system (refer to Japanese Unexamined Patent Publication (Translation of PCT Application) No. 2008-515110, for example).

SUMMARY OF THE INVENTION

However, the above conventional method has problems that the image synthesis is performed without using a focus condition of a shooting optical system and, in the case of relatively large difference between shooting distances to a plurality of subjects present within a certain imaging area, it is hard to obtain an image in focuses on all the subjects from an image signal picked up by one-time shooting.

The object of the present invention is to provide an imaging apparatus which enables to appropriately obtain an image in focuses on a plurality of subjects with different shooting distances even if the difference between shooting distances to subjects present in a certain imaging area is relatively large.

The above object is achieved by the following aspects of the present invention. Although an aspect of the present invention will be described herein with reference to reference numerals to be used in figures for the embodiments according to the present invention, these reference numerals are used herein in order for the present invention to be easily understood and they are not intended to limit the invention.

The present invention is an imaging apparatus comprising:

a light receiving element having a micro lens array provided with a plurality of micro lenses (111a) arranged two-dimensionally, and a plurality of photoelectric conversion elements (112a) provided for the plurality of micro lenses, and outputting a light receiving signal obtained by receiving a light beam from an optical system via the micro lens array;

a detector (152) that detects a shift amount of image plane by the optical system for a plurality of focus detecting positions set at a plurality of positions in the image plane by the optical system; and a controller (160) that determines a focus adjusting range for the optical system based on the shift amount detected for each of the plurality of focus detecting positions, and obtains the light receiving signal at each of different positions within the focus adjusting range with the light receiving element.

In the image apparatus according to the present invention, the controller (160) determines the different positions in accordance with a range of the image plane where an image based on the light receiving signal is enabled to be produced and the focus adjusting range based on the shift amount.

In the image apparatus according to the present invention, the range of the image plane where the image is enabled to be produced is determined based on each effective diameter of the micro lenses (111a) and each size of the photoelectric conversion elements (112a).

In the image apparatus according to the present invention, the controller (160) determines the focus adjusting range based on a difference between a first shift amount corresponding to the nearest view side with respect to the optical system and a second shift amount corresponding to the farthest image view with respect to the optical system out of shift amounts respectively detected for the plurality of the focus detecting positions.

In the image apparatus according to the present invention, the controller (160) determines the focus adjusting range for the optical system such that a range of the difference between the first shift amount and the second shift amount is included in a range obtained by continuously cascading ranges of the image plane where an image based on the light receiving signal is enabled to be produced at the different positions.

The imaging apparatus according to the present invention may further includes a recognition device that recognizes an image of a specific subject from an image by the optical system, wherein the controller (160) determines the focus adjusting range based on the shift amount detected for a focus detecting position corresponding to the image recognized by the recognition device out of the plurality of the focus detecting positions.

The imaging apparatus according to the present invention may further includes a synthesizer (160) that synthesizes an image at a specific image plane by the optical system based on the light receiving signal.

The imaging apparatus according to the present invention may further includes a memory (170) that memorizes the shift amount together with the light receiving signal relevant thereto.

In the image apparatus according to the present invention, the detector (152) detects the shift amount of the image plane by the optical system based on the light receiving signal.

The present invention is an image synthesis method comprising:

detecting a shift amount of an image plane by an optical system for a plurality of focus detecting positions set at a plurality of positions in the image plane by the optical system;

determining a focus adjusting range for the optical system based on the shift amount detected for each of the plurality of focus detecting positions;

generating a light receiving signal by receiving a light beam from the optical system at a plurality of focus adjusting positions within the focus adjusting range with a plurality of photoelectric conversion elements which is provided for a micro lens array having a plurality of micro lenses arranged two-dimensionally, the light beam passing through the micro lens array; and synthesizing an image at a specific image plane by the optical system corresponding to the focus adjusting range based on the light receiving signal.

According to the present invention, it is enabled to appropriately obtain an image of an image plane in focuses on images of a plurality of subjects present within an image plane of an optical system.

DESCRIPTION OF THE PREFERRED EMBODIMENTS

Figure 1:
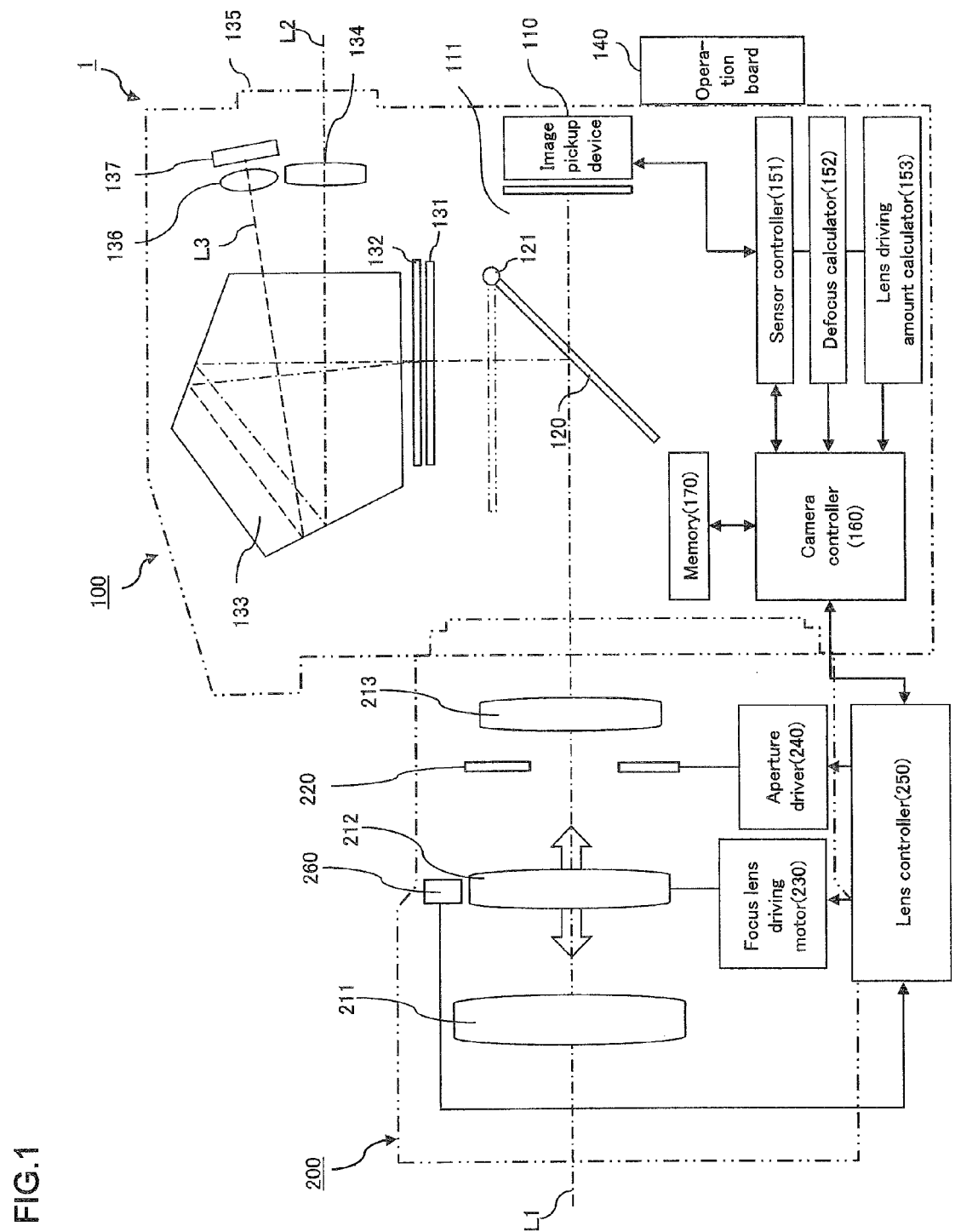
FIG. 1 is a block diagram illustrating a single-lens reflex digital camera 1 according to the present embodiment.

Hereinafter, embodiments according to the present invention will be described with reference to the drawings. FIG. 1 is a block diagram illustrating a single-lens reflex digital camera 1 according to the present embodiment, and illustration and description as for a general structure of a camera are omitted except for the structure relevant to the imaging apparatus according to the present invention.

The single-lens reflex digital camera 1 (hereinafter referred to as simply "camera 1") according to the present embodiment has a camera body 100 and a lens barrel 200, and the camera body 100 and the lens barrel 200 are detachably jointed to each other by means of a mount mechanism.

The lens barrel 200 is provided therein with a shooting optical system including lenses 211, 212, and 213 and an aperture 220.

The focus lens 212 is provided movably along an optical axis L1 of the lens barrel 200, and the position thereof is adjusted by a focus lens driving motor 230 while the position is detected by an encoder 260.

Specific structure of a moving mechanism for the focus lens 212 along the optical axis L1 is not particularly limited. For example, a rotatable barrel forming a helicoidal groove (screw-shaped groove) on the inner surface thereof is rotatably inserted into a fixed barrel fixed to the lens barrel 200, a lens frame having a side projection is provided to hold the focus lens 212, and the side projection of the lens frame is engaged in the helicoidal groove. By using the focus lens driving motor 230 and rotating the rotatable barrel, the focus lens 212 held by the lens frame moves on a straight line along the optical axis L1. It is to be noted that, although the lenses 211 and 213 are provided in the lens barrel 200 in addition to the focus lens 212, the present embodiment will be described with reference to the focus lens 212 hereinafter.

As described above, the focus lens 212 held by the lens frame moves on a straight line along the optical axis Li by rotating the rotatable barrel to the lens barrel 200. As a driving source thereof, the focus lens driving motor 230 is provided in the lens barrel 200. The focus lens driving motor 230 and the rotatable barrel are connected mechanically to each other through a transmission configured to have a plurality of gears. When the drive shaft of the focus lens driving motor 230 is driven to rotate in either one direction, the driving force is transmitted by a predetermined gear ratio to drive the rotatable barrel in a certain direction, thereby moving the focus lens 212 held by the lens frame straight ahead along the optical axis L1 in a certain direction. Contrary to this, when the drive shaft of the focus lens driving motor 230 is driven to rotate in the opposite direction, gears of the transmission also rotate in opposite directions, and the focus lens 212 moves straight ahead along the optical axis L1 in the reverse direction.

The position of the focus lens 212 is detected by the encoder 260. As described above, the position of the focus lens 212 in the direction of the optical axis L1 is correlative to the rotating angle of the rotatable barrel. Therefore, the position of the focus lens 212 can be determined by detecting a relative rotating angle of the rotatable barrel to the lens barrel 200, for example.

As the encoder 260 according to the present embodiment, various kinds of encoders may be used. For example, an optical sensor such as a photo interrupter detecting rotation of a rotating disk interlocked to the rotatable barrel rotatably and outputting a pulse signal in accordance with the rotation of the disk may be used. Or an encoder having an encoder pattern and a brush contact to contact with the encoder pattern may be used. The encoder pattern is provided with a flexible wiring board on either one of the fixed barrel or the rotatable barrel, and the brush contact is provided on the other. In this encoder, the change in a contacting position is detected by a detecting circuit depending on a driving amount of the rotatable barrel (Either the rotating direction or the direction of the optical axis may be employed).

The focus lens 212 is movable in the direction of the optical axis L1 within a range from an end position at the side of the camera body 110 (also referred to as "the near end") to an end position at the side of a subject (also referred to as "the infinite end") by rotating the above-mentioned rotatable barrel. Herein, the encoder 260 detects the present position of the focus lens 212, and information relevant to the present position is transmitted via a lens controller 250 to a camera controller 160 to be described later. A driving amount for the focus lens 212 calculated based on the received information is transmitted to the focus lens driving motor 230 via the lens controller 250, and the focus lens driving motor 230 is driven based on the received driving amount.

The aperture 220 is configured to have an adjustable aperture size centering around the optical axis L1 so as to limit an amount of light beam passing through the above-mentioned shooting optical system and reaching an image pickup device 110 provided within the camera body 100 and to adjust a blur amount. The adjustment for the aperture size of the aperture 220 is accomplished by obtaining a signal in accordance with an appropriate aperture size calculated in an automatic exposure mode, for example, and transmitting the obtained signal from the camera controller 160 via the lens controller 250. Alternatively, the aperture size may be set by manual operation at an operation board 140 provided on the camera body 100, and in this case the set aperture size is input from the camera controller 160 to the lens controller 250. The aperture size of the aperture 220 is detected by an aperture size detector not shown, and the present aperture size is recognized by the lens controller 250.

Meanwhile, the camera body 100 is provided therein with a quick return mirror 120 in order that the quick return mirror 120 guides the light beam from a subject to the image pickup device 110, a view finder 135, and a photometric sensor 137. The quick return mirror 120 moves pivotally around a pivot axis 121 within a certain angular range between an observing position to a subject and a shooting position to the subject. FIG. 1 illustrates two statuses of the quick return mirror 120, one for the observing position to the subject indicated by solid lines and the other for the shooting position to the subject indicated by two-dot chain lines. The quick return mirror 120 moves pivotally between the two statuses, that is, in the observing position to the subject, the quick return mirror 120 is positioned on an optical path of the optical axis L1, whereas in the shooting position to the subject, the quick return mirror 120 escapes from the optical path of the optical axis L1.

The quick return mirror 120 is configured as a half mirror to reflect and guide certain optical beams (optical axes L2 and L3) extracted from the optical beam (optical axis L1) from the subject respectively to the view finder 135 and the photometric sensor 137, and to transmit and guide the residual optical beam to the image pickup device 110, in the status of the observing position to the subject.

Accordingly, when the quick return mirror 120 is positioned at the observing position, the optical beam (optical axis L1) from the subject is guided to the view finder 135, the photometric sensor 137 and the image pickup device 110, then the subject is observed by a photographer, and a calculation of exposure and a detection for a focusing adjustment status of the focus lens 212 are performed. Herein, full pressing by the photographer of a shutter release button (not shown) provided at the operation board 140 allows the quick return mirror 120 to move pivotally to the shooting position, then the optical beam (optical axis L1) from the subject is fully guided to the image pickup device 110, and the shooting of the subject is performed.

The optical beam from the subject reflected by the quick return mirror 120 forms an image on a focal plane plate 131 arranged at a plane equivalent optically to the image pickup device 110, and then the optical beam is guided into an ocular globe of the photographer via a pentagonal prism 133 and an ocular lens 134. At this time, a transmissive type liquid crystal display device 132 displays a focus detecting area mark or the like by superimposing onto an image of the subject formed on the focal plane plate 131, and displays information pieces relevant to the shooting, such as a shutter speed, an aperture value, and the number of shootings, at an outer area not overlapping the image of the subject. This allows the photographer to observe both the subject and the back-ground thereof, and the information relevant to the shooting and the like, through the view finder 135 in a shooting standby status.

The photometric sensor 137 is configured by using a two-dimensional color CCD image sensor or the like. The photometric sensor 137 is assigned with a plurality of areas obtained by dividing a shooting screen, and outputs a photometric signal in accordance with the luminance of each area in order for an exposure value to be calculated at the time of shooting. Image information detected in the photometric sensor 137 is output to the camera controller 160 and is utilized for an automatic exposure control.

The image pickup device 110 is provided on the optical axis L1 of the light beam from a subject and in the camera body 100. In addition, a micro lens array 111 is placed at the front of the image pickup device 110, and such a configuration is obtained that photoelectric conversion elements of the image pickup device 110 receives light passing through the micro lens array 111. It is to be noted that the micro lens array 111 is located just on or in the vicinity of a position to be a possible focusing plane of the shooting optical system.

Figure 2:
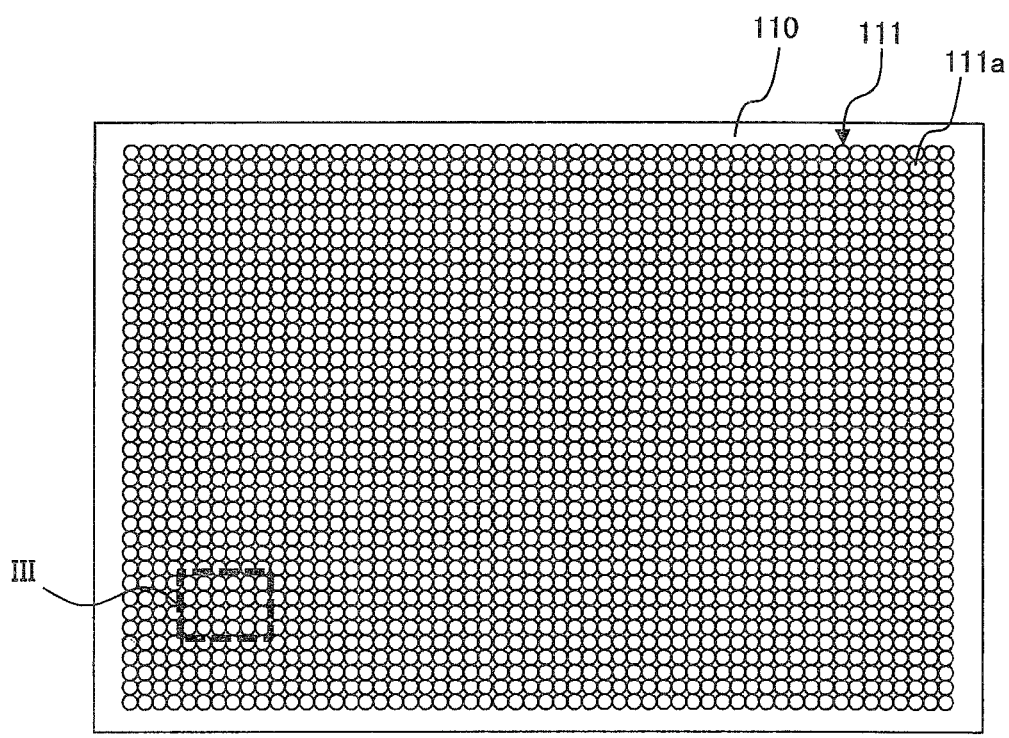
FIG. 2 is a plan view illustrating an image pickup device 110 provided with a micro lens array 111 shown in FIG. 1.

Herein, FIG. 2 is a plan view illustrating the image pickup device 110 provided with the micro lens array 111 shown in FIG. 1, and the plan view is a view seen from the micro lens array 111 side. As shown in FIG. 2, the micro lens array 111 has a plurality of micro lenses 111a densely arranged in a two-dimensional plane.

Figure 3:
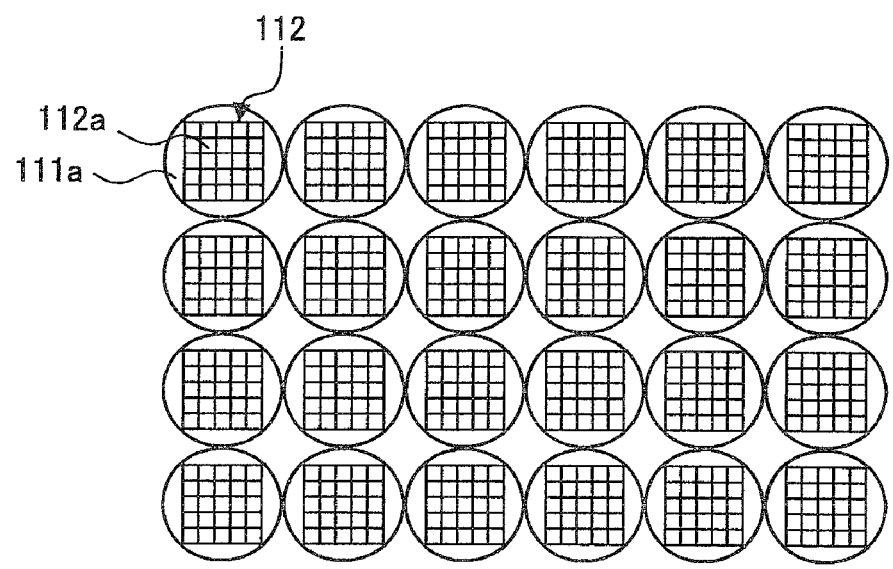
FIG. 3 is an enlarged view of the area designated by reference Roman numeral III in FIG. 2.

FIG. 3 is an enlarged view of the area designated by reference Roman numeral III in FIG. 2. As shown in FIG. 3, the image pickup device 110 has a plurality of photoelectric conversion element array 112 configured with a plurality of photoelectric conversion elements 112a for each micro lens. Light passing through each micro lens 111a is received by the plurality of the photoelectric conversion elements 112a forming each photoelectric conversion element array 112 allocated to the relevant micro lens 111a. Although FIG. 3 illustrates the photoelectric conversion elements 112a of the photoelectric conversion element array 112 corresponding to each micro lens 111a such that each number (depending on pixel density) of the elements 112a in the vertical direction and the horizontal direction is five, these numbers are not particularly limited. A light receiving signal obtained by receiving light on each photoelectric conversion element 112a forming the photoelectric conversion element array 112 is transmitted to a sensor controller 151. More specifically, light receiving signals transmitted from the image pickup device 110 to the sensor controller 151 are further transmitted to the camera controller 160, and are stored in a memory 170 after being converted into an image data, and on the other hand used for a defocus calculation by a defocus calculator 152 when the quick return mirror 120 is located at the observing position.

The sensor controller 151 controls the light receiving by each photoelectric conversion element 112a forming the photoelectric conversion element array 112 of the image pickup device 110, and further controls a gain, a storage time, and the like such that the light receiving signal to be obtained by each photoelectric conversion element 112a becomes to be appropriate. The sensor controller 151 also receives the signal from the image pickup device 110 and transmits the signal to be received to the camera controller 160 and the defocus calculator 152.

Figure 4:
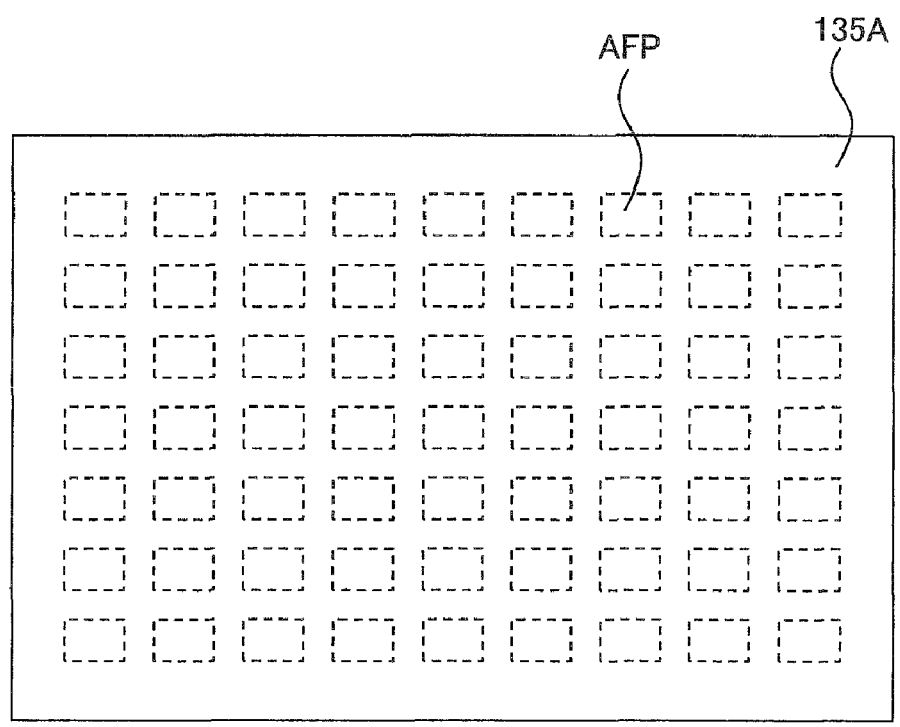
FIG. 4 is a view illustrating a shooting screen 135A including focus detecting areas AFP to be observed through a view finder 135.

The defocus calculator 152 receives the signal from the sensor controller 151 and determines, based on the signal to be received, which micro lenses 111a are allocated to a certain area corresponding to each focus detecting area (or auto focus point) AFP shown in FIG. 4, and reads out the output of each photoelectric conversion element 112a relevant to the determined micro lenses 111a as a signal for focus detecting. Herein, FIG. 4 is a view illustrating a shooting screen 135A to be observed through the view finder 135. in the present embodiment, the shooting screen 135A includes a plurality of focus detecting areas AFP and the number thereof is 63 as shown in FIG. 4.

As described above, the micro lens array 111 (each micro lens 111a) is located just on or in the vicinity of a position to be a possible focal plane of the shooting optical system. Therefore, a pupil image of the shooting optical system is image-formed by each micro lens 111a on the image pickup device 110 located behind the micro lens array 111 (each micro lens 111a). Because each photoelectric conversion element 112a forming the photoelectric conversion element array 112 of the image pickup device 110 corresponds to each part of the pupil, if the photoelectric conversion elements 112a are selected for each micro lens 111a and signals therefrom are combined, it is possible to obtain an image picked up at a certain aperture determined by the selected photoelectric conversion elements 112a. According to the present embodiment, the defocus calculator 152 combines outputs from the photoelectric conversion elements 112a each corresponding to each part of the pupil to obtain an image. The obtained image is utilized for a calculation of an image shift amount by using a pupil division phase difference detecting method. Thus, a defocus amount df at each of a plurality of positions respectively depending on the focus detecting areas AFP can be obtained.

The defocus calculator 152 determines, with reference to the defocus amounts df at the plurality of positions respectively depending on the focus detecting areas AFP, a near side focus detecting area $AFP_1$ where a near side defocus amount $df_1$ for the nearest side is detected and a far side focus detecting area $AFP_2$ where a far side defocus amount $df_2$ for the farthest side is detected, and transmits the near side and the far side defocus amounts $df_1$ and $df_2$ respectively at the focus detecting areas $AFP_1$ and $AFP_2$ to a lens driving amount calculator 153. The defocus calculator 152 also transmits the defocus amounts df at the plurality of positions respectively depending on the focus detecting areas AFP to the camera controller 160.

The lens driving amount calculator 153 performs a calculation for a driving amount of the focus lens 212 based on the near side defocus amount $df_1$ and the far side defocus amount $df_2$ transmitted from the defocus calculator 152. More specifically, the lens driving amount calculator 153 calculates a near side driving amount $\Delta W_1$ of the focus lens 212 to a certain position required for the near side defocus amount $df_1$ to become zero, a far side driving amount $\Delta W_2$ of the focus lens 212 to a certain position required for the far side defocus amount $df_2$ to become zero, and a total driving amount $\Delta W_a$ of the focus lens 212. Herein, the total driving amount $\Delta W_a$ of the focus lens 212 is a driving amount required for the focus lens 212 to be driven from the position where the near side defocus amount $df_1$ becomes zero to the position where the far side defocus amount $df_2$ becomes zero. Thus, the total driving amount $\Delta W_a$ of the focus lens 212 is an amount depending on dispersion of the defocus amounts df at the plurality of positions respectively depending on the focus detecting areas AFP (i.e., the difference between the near side defocus amount $df_1$ and the far side defocus amount $df_2$). The driving amounts $\Delta W_1$, $\Delta W_2$, and $\Delta W_a$ obtained in the lens driving amount calculator 153 are transmitted to the camera controller 160.

Figure 5:
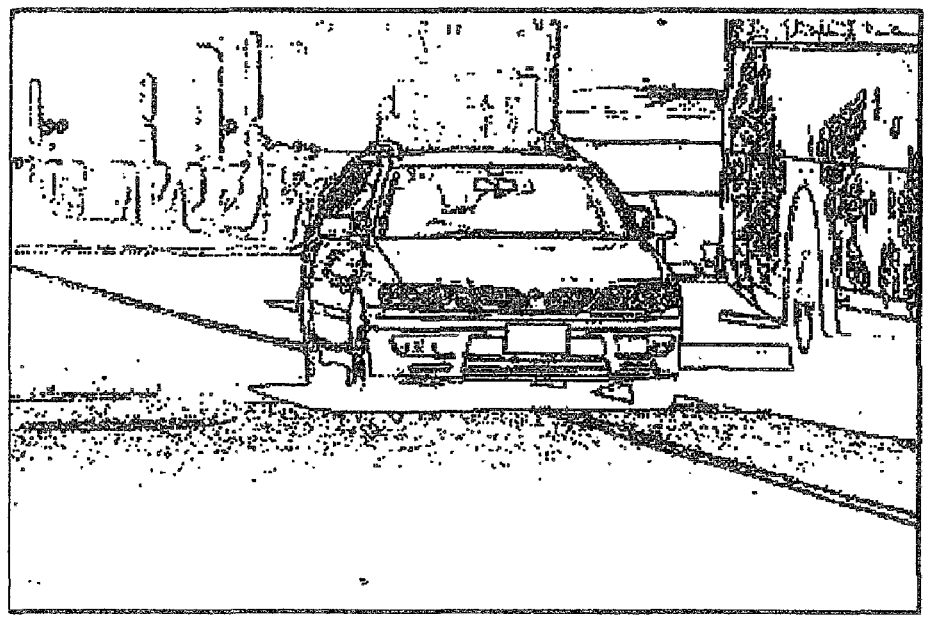
FIG. 5 is a view illustrating a scene example according to the present embodiment.
Figure 6:
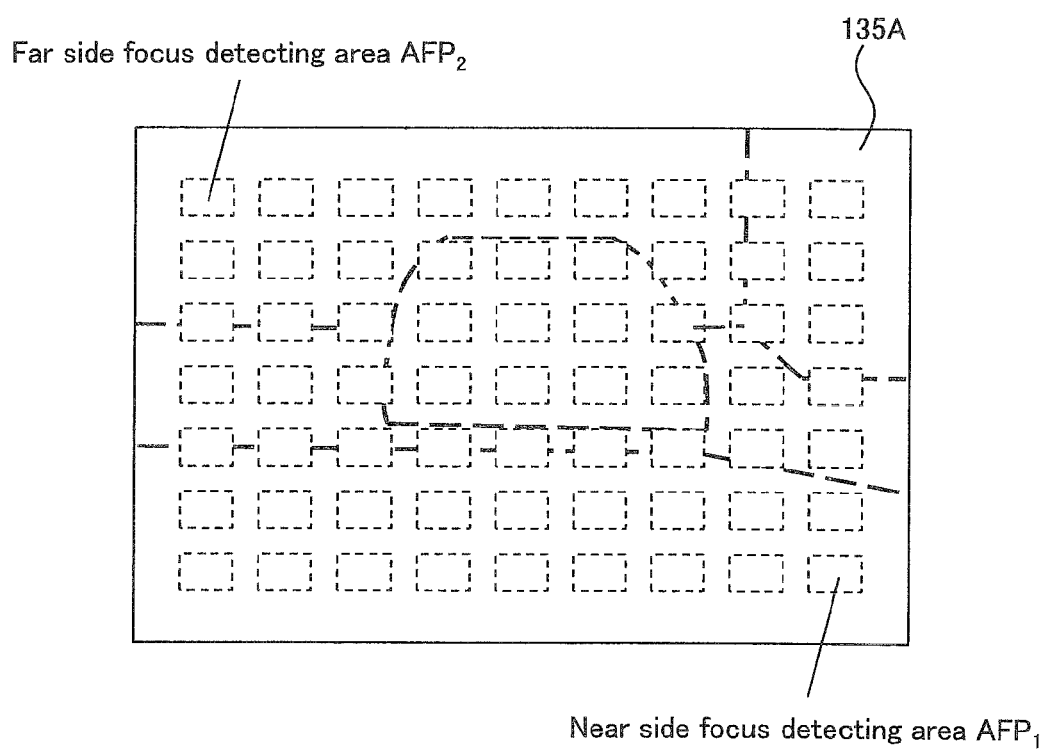
FIG. 6 is a view illustrating a near side focus detecting area $AFP_1$ and a far side focus detecting area $AFP_2$ in the scene example shown in FIG. 5.

Referring to FIG. 5 in which a scene example is illustrated, the near side focus detecting area $AFP_1$ giving the near side defocus amount $df_1$ and the far side focus detecting area $AFP_2$ giving the far side defocus amount $df_2$ corresponds respectively to a lower right area and an upper left area in the shooting screen 135A as shown in FIG. 6, for example. Therefore, for the scene example shown in FIG. 5, the defocus calculator 152 can determine the lower right area and the upper left area, in the shooting screen 135A as shown in FIG. 6, respectively as the near side and the far side focus detecting areas $AFP_1$ and $AFP_2$. The lens driving amount calculator 153 calculates the driving amounts $\Delta W_1$, $\Delta W_2$, and $\Delta W_a$ in accordance with the near side and the far side defocus amounts $df_1$ and $df_2$ respectively detected in these focus detecting areas $AFP_1$ and $AFP_2$.

The operation board 140 is provided with the shutter release button and input switches for a photographer to set various operating modes of the camera 1, thereby enabling the photographer not only to select from AUTO FOCUS MODE/MANUAL FOCUS MODE but also to select a focus bracketing mode for performing a focus bracketing shooting in accordance with the present embodiment (the focus bracketing shooting will be described later). In addition, the shutter release button has switches including a first switch SW1 and a second switch SW2. The first switch SW1 is turned ON when the button is half-pressed, whereas the second switch SW2 is turned ON when the button is pressed fully. Information regarding the switches SW1 and SW2 of the shutter release button and various modes set by means of the operation board 140 is transmitted to the camera controller 160, and the camera controller 160 controls entire operation of the camera 1.

The camera body 100 is provided therein with the camera controller 160. The camera controller 160, which is configured with a microprocessor and peripheral parts such as memories, is electrically connected with the lens controller 250 via electrical signal contacts provided on the above-mentioned mount mechanism. The camera controller 160 receives lens information from the lens controller 250 and transmits information regarding an aperture control signal and the like to the lens controller 250.

The camera controller 160 determines a focus bracketing shooting condition according to the present embodiment when the focus bracketing mode is selected by a photographer and the shutter release button provided at the operation board 140 is fully pressed such that the second switch SW2 turns ON. Herein, the focus bracketing shooting is a shooting method of sequentially shooting a plurality of shot images with different focus adjusting positions through repeating the driving of the focus lens 212 and the shooting of a subject by the image pickup device 110. The camera controller 160 determines, as specific conditions of the focus bracketing shooting, a number N of images to be sequentially shot at the time of the focus bracketing shooting and a driving amount $W_s$ of the focus lens 212 at the time of the focus bracketing shooting. The information regarding the determined number N of images to be sequentially shot and the determined driving amount $W_s$ of the focus lens 212 is transmitted to the sensor controller 151 and the lens controller 250. Based on the information, the focus bracketing shooting is performed through that the sensor controller 151 and the lens controller 250 respectively controls the image pickup device 110 and the focus lens driving motor 230. Determining methods will be described later in detail for the number N of images to be sequentially shot and the driving amount $W_s$ at the time of the focus bracketing shooting.

The camera controller 160 also performs an image synthesis, based on the photographer's selection via the operation board 140, by using the plurality of shot images through the focus bracketing shooting. More specifically, the camera controller 160 firstly receives signals for the plurality of shot images through the focus bracketing shooting from the sensor controller 151, next converts the signals into images data and saves the images data into the memory 170 as images data for the plurality of shot images. Then, the camera controller 160 performs the image synthesis for the plurality of shot images obtained through the focus bracketing shooting in accordance with the images data saved in the memory 170 for the plurality of shot images, and saves the obtained synthetic image into the memory 170. The image synthesis is performed based on the data for the defocus amounts df, calculated in the defocus calculator 152, at the plurality of positions respectively depending on the focus detecting areas AFP, and the information of the driving amount $W_s$ for the focus lens 212. Specific method of the image synthesis will be described later.

Alternatively, in the case that the photographer's selection is not to perform the image synthesis for the plurality of shot images obtained through the focus bracketing shooting, no image synthesis is performed and the camera controller 160 saves into the memory 170 the images data for the plurality of shot images obtained through the focus bracketing shooting together with the data regarding the defocus amounts df at the plurality of positions respectively depending on the focus detecting areas AFP and the information of the driving amount $W_s$ for the focus lens 212.

Figure 7:
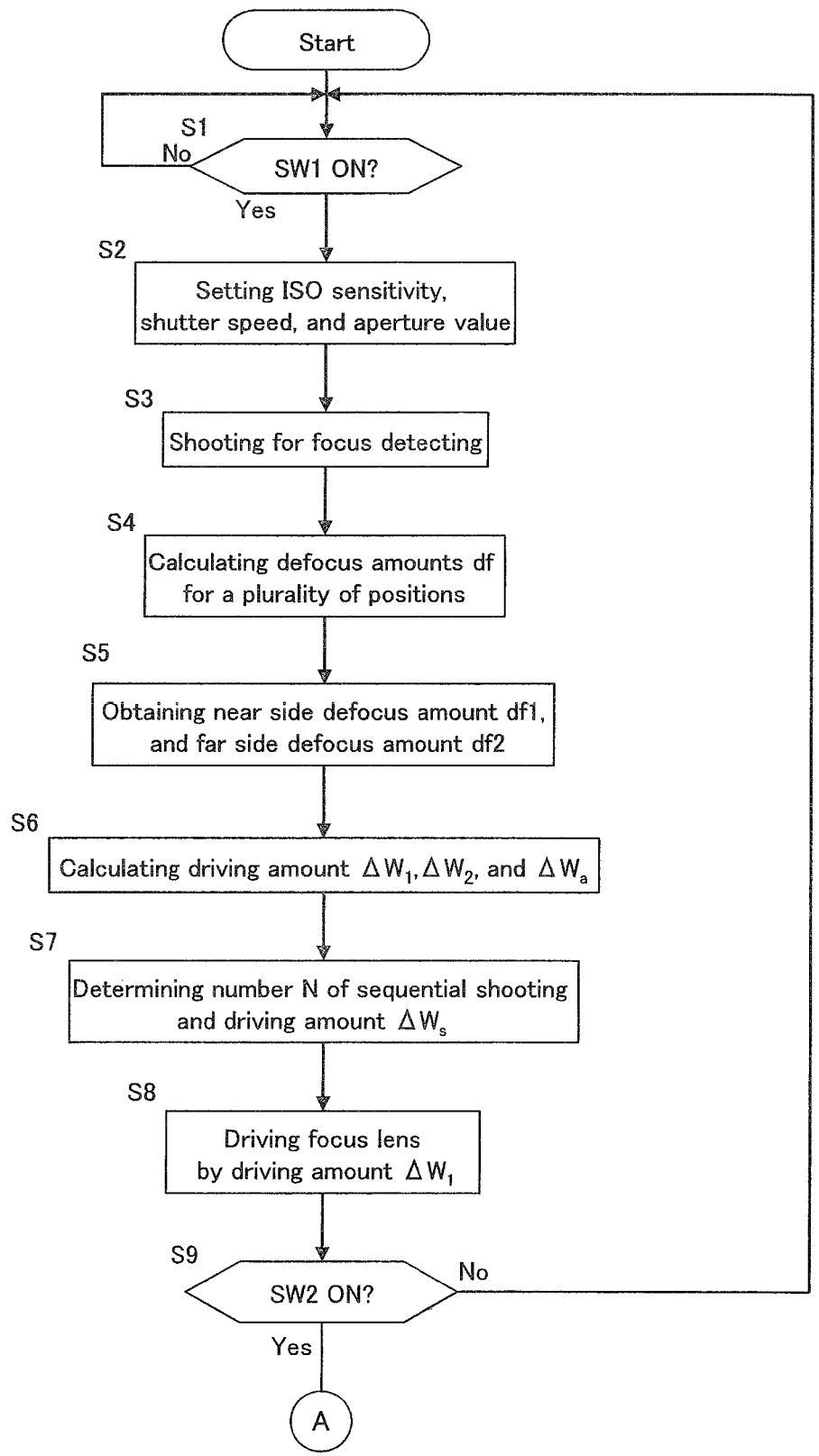
FIG. 7 is a flowchart (part 1) illustrating an operation of the camera 1 according to the present embodiment.
Figure 8:
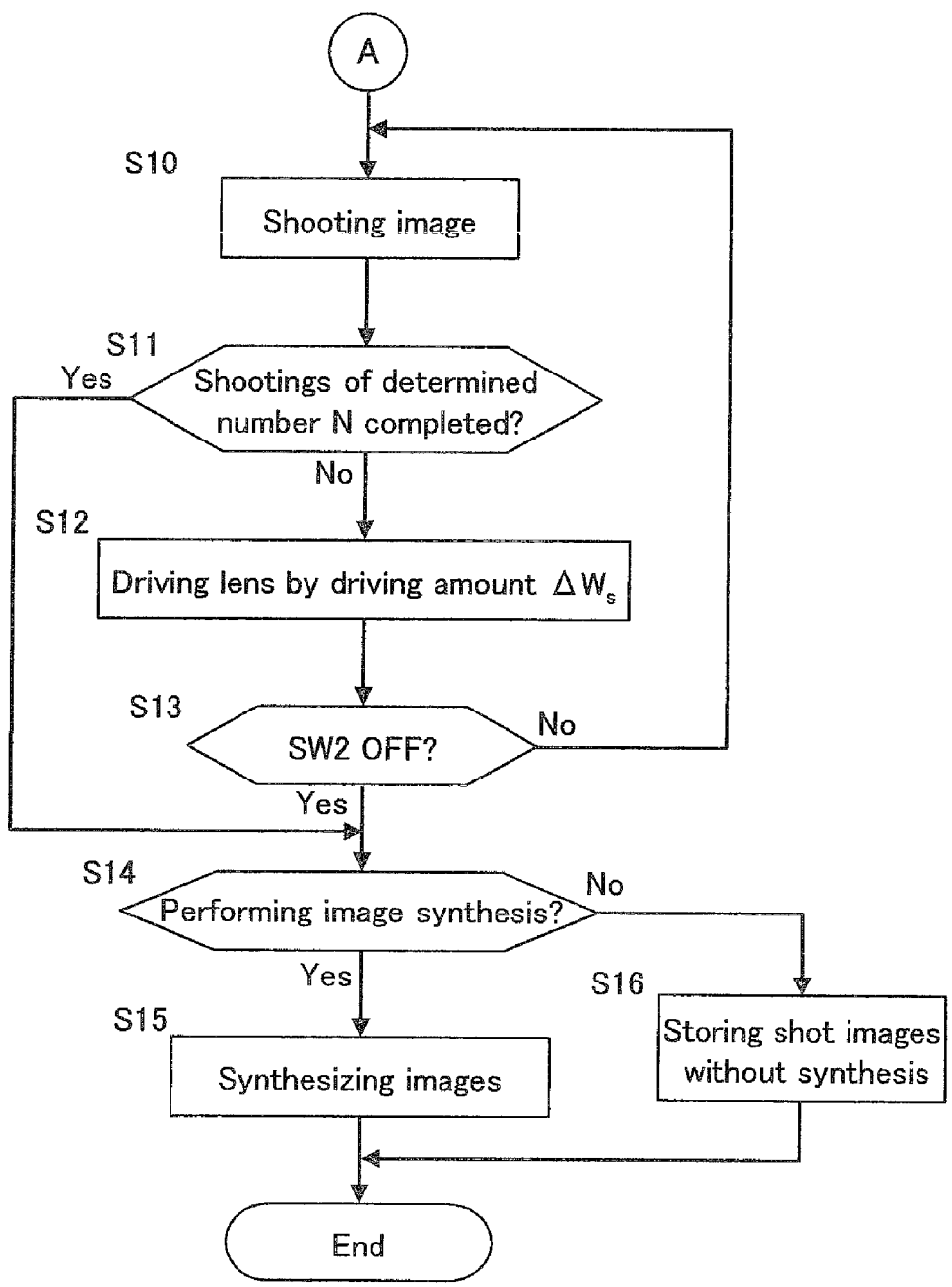
FIG. 8 is a flowchart (part 2) illustrating the operation of the camera 1 according to the present embodiment.

Hereinafter, an operational example of the camera 1 according to the present embodiment will be described. FIGS. 7 and 8 illustrate a flowchart for an operation of the camera 1 according to the present embodiment. Explained hereinafter is an operation in the case that the camera 1 is set to "Focus Bracketing Mode" for performing the focus bracketing shooting according to the present embodiment.

Firstly, in step S1, the camera controller 160 determines whether or not the shutter release button has been half-pressed (the first switch SW1 being turned ON) by a photographer. If the first switch SW1 has been turned ON, then the process proceeds to step S2, whereas if the switch SW1 has not been turned ON, then the process stands by at step S1.

After the shutter release button is half-pressed and the first switch SW1 is turned ON, the camera controller 160 sets, in step S2, an ISO sensitivity, a shutter speed, and an aperture value in order that an appropriate exposure is obtained. The ISO sensitivity, the shutter speed, and the aperture value are set based on the photometric signal output from the photometric sensor 137, for example. The set ISO sensitivity and the set shutter speed are transmitted to the sensor controller 151 and the set aperture value is transmitted to the lens controller 250, and they are used as a shooting condition at the time of performing the focus bracketing shooting to be described later. Alternatively, in the case that a user has preliminarily set the ISO sensitivity, the shutter speed, and the aperture value via the operation board 140, the preliminarily set values may be used.

In the following step S3, the image pickup device 110 performs light receiving, in accordance with the signal from the sensor controller 151, of a light beam from the shooting optical system, thereby performing a shooting for the focus detecting. Herein, the shooting for the focus detecting is performed in the condition where the quick return mirror 120 is located at the shooting position. Thus, the signal depending on each photoelectric conversion element 112a is transmitted from the image pickup device 110 to the sensor controller 151.

In the following step S4, the defocus calculator 152 obtains the signal depending on each photoelectric conversion element 112a from the sensor controller 151, and selects and reads out a signal for the focus detecting from the obtained signals. Based on this, the defocus calculator 152 performs a calculation of an image shift amount by the pupil division phase difference detecting method and calculates out the defocus amount df at each of the plurality of positions respectively depending on the focus detecting areas AFP shown in FIG. 4. The calculated defocus amount df at each of the plurality of positions respectively depending on the focus detecting areas AFP is transmitted to the camera controller 160.

In the following step S5, the defocus calculator 152 determines, with reference to the defocus amounts df at the plurality of positions respectively depending on the focus detecting areas AFP calculated in step 4, the near side focus detecting area $AFP_1$ where the near side defocus amount $df_1$ for most near side is detected and the far side focus detecting area $AFP_2$ where the far side defocus amount $df_2$ for most far side is detected, and transmits the near side and the far side defocus amounts $df_1$ and $df_2$ to the lens driving amount calculator 153 and the camera controller 160.

In the following step S6, the lens driving amount calculator 153 calculates the near side driving amount $\Delta W_1$ and the far side driving amount $\Delta W_2$ depending respectively on the near side defocus amount $df_1$ and the far side defocus amount $df_2$ by using the defocus amounts $df_1$ and $df_2$ obtained in step S5, and the total driving amount $\Delta W_a$ of the lens required for the focus lens 212 to be driven from the position where the near side defocus amount $df_1$ becomes zero to the position where the far side defocus amount $df_2$ becomes zero. The calculated near side driving amount $\Delta W_1$, the far side driving amount $\Delta W_2$, and the total driving amount $\Delta W_a$ are transmitted to the camera controller 160.

In the following step S7, the camera controller 160 determines, based on the total driving amount $\Delta W_a$ of the lens transmitted from the lens driving amount calculator 153, the number N of images to be sequentially shot at the time of the focus bracketing shooting and the driving amount $\Delta W_s$ (the driving amount $\Delta W_s$ for the focus bracketing shooting) of the focus lens 212 at the time of the focus bracketing shooting. Because the driving amount $\Delta W_s$ is a one-time lens driving amount at one-time shooting in the time of performing the focus bracketing shooting, the shooting by the image pickup device 110 and the driving of the focus lens 212 based on the driving amount $\Delta W_s$, are repeated in the focus bracketing shooting according to the present embodiment. In addition, the driving amount $\Delta W_s$ corresponds to an image plane moving amount between each adjacent two sequentially shot images at the time of shooting the plurality of shot images for the focus bracketing shooting.

Figure 9:
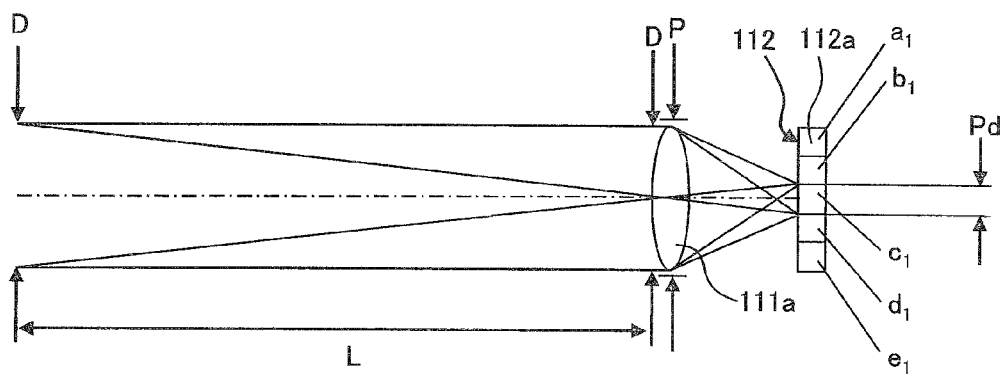
FIG. 9 is a view illustrating a light beam being incident to, via a micro lens 111a, a certain picture element $c_1$ out of photoelectric conversion elements 112a fainting a photoelectric conversion element array 112.

What will be described hereinafter is a range (image synthesis range) of an image plane capable of being image-synthesized based on the light receiving signal obtained by the image pickup device. FIG. 9 illustrates a light beam being incident, via the micro lens 111a, to a certain photoelectric conversion element $c_1$ out of the photoelectric conversion elements 112a forming the photoelectric conversion element array 112. It is to be noted that the photoelectric conversion elements 112a forming the photoelectric conversion element array 112 are designated by reference characters $a_1, b_1, c_1, d_1$, and $e_1$ in FIG. 9. In the imaging apparatus according to the present embodiment, an optical resolution of the obtained image corresponds to one micro lens as one unit of pixel. Therefore, a range of the image plane, within which images can be synthesized with a certain optical resolution, is determined by a distance L from the micro lens 111a to a position where the size of a inverted image of the photoelectric conversion element 112a is approximately equal to the effective diameter D of the micro lens 111a, as shown in FIG. 9. In other words, if light from an area with a size same as the effective diameter D (D<arrangement pitch P) of the micro lens 111a passes through the micro lens 111a and is incident to the single photoelectric conversion element $c_1$, there can be obtained an optical resolution corresponding to one micro lens as one unit of pixel. Accordingly, the distance L is intended to mean the image synthesis range.

Particularly in the focus bracketing shooting, through shooting by the image synthesis range L across a range (a range in the optical axis direction) of image planes expected to be synthesized, positions of image planes capable of being image-synthesized can be sequenced. Accordingly, it is enough to perform the focus bracketing shooting by the lens driving amount $\Delta W_s$ corresponding to an interval of the image moving amount obtained based on the image synthesis range L.

For the above purpose, the camera controller 160 determines, based on the total driving amount $\Delta W_a$ of the focus lens 212 obtained by the lens driving amount calculator 153, the number N of images to be sequentially shot at the time of the focus bracketing shooting and the driving amount $\Delta W_s$ for the focus bracketing shooting such that the image plane moving amount at the time of driving the focus lens 212 by the driving amount $\Delta W_s$ becomes within the image synthesis capable range L. More specifically, the camera controller 160 determines the number N of images to be sequentially shot and the driving amount $\Delta W_s$ such that, when the focus lens 212 is driven (N−1) times by the driving amount $\Delta W_s$ the total driving amount of the focus lens 212 becomes to correspond to the total driving amount $\Delta W_a$. Although the method of determining the number N of images to be sequentially shot and the driving amount $\Delta W_s$ is not particularly limited, they may be appropriately set, for example, in accordance with a total exposure time at the time of performing the focus bracketing shooting and/or the total driving amount $\Delta W_a$ obtained by the lens driving amount calculator 153. For example, in the case that the total exposure time is relatively long, the number N of images to be sequentially shot may be set as a relatively large number, while in the case that the total driving amount $\Delta W_a$ is relatively large, the driving amount $\Delta W_s$ may be set as a relatively large amount.

After determined in the camera controller 160, the determined number N of images to be sequentially shot at the time of the focus bracketing shooting is transmitted to the sensor controller 151, and the determined driving amount $\Delta W_S$ for the focus bracketing shooting is transmitted to the lens controller 250.

In the following step S8, the camera controller 160 transmits the driving amount $\Delta W_1$ depending on the near side defocus amount $df_1$ to the lens controller 250, and the lens controller 250 drives the focus lens driving motor 230 based on the driving amount $\Delta W_1$, thereby the focus lens 212 moves. By moving the focus lens 212 based on the driving amount $\Delta W_1$, there can be obtained a condition in which a subject with the near side defocus amount $df_1$ for most near side detected at the near side focus detecting area $AFP_1$ is focused.

In the following step S9, the camera controller 160 determines whether or not the shutter release button has been fully pressed (the second switch SW2 being turned ON) by the photographer. If the second switch SW2 has been turned ON, then the process proceeds to step S10, whereas if the second switch SW2 has not been turned ON, then the process returns to step S1 and repeats steps S2 to S9 provided that the shutter release button is half-pressed and the first switch SW1 maintains to be turned ON.

As described above, if the shutter release button is fully pressed and the second switch SW2 is turned ON, the process proceeds to step S10 shown in FIG. 8. Then, by repeating the operations of steps S10 to 513, the focus bracketing shooting is performed in accordance with the number N of images to be sequentially shot and the driving amount $\Delta W_s$ determined in step S7.

More specifically, in step S10, the shooting of an image is performed at first by the image pickup device 110 in the condition where the lens position of the focus lens 212 is being at a position depending on the near side defocus amount $df_1$ used for the moving in step S8 or at a position corresponding to the lens position after the driving in step S12 to be described later. Next, the image pickup device 110 transmits a signal depending on each photoelectric conversion element 112a to the sensor controller 151. Then, the camera controller 160 receives the signal from the image pickup device 110 via the sensor controller 151, and after converting the received signal to an image data, transmits and saves the image data to the memory 170 together with the defocus amount df for each focus detecting area AFP calculated in the defocus calculator 152 and the driving amount $\Delta W_s$, of the focus lens 212.

In the following step S11, the camera controller 160 determines whether or not the shootings of the number N determined in step S7 of images to be sequentially shot has been completed. If the shootings of the determined number N has not been completed, then the process proceeds to step S12, whereas if the shootings of the determined number N has been completed, then the process proceeds to step S14 after finishing the focus bracketing shooting.

In step S12, the lens controller 250 drives the focus lens 212 to move toward the far side based on the driving amount $W_s$ for the focus bracketing shooting determined in step S7.

In the following step S13, it is determined whether or not that the full pressing of the shutter release button has been canceled, and the second switch SW2 has been turned OFF. If the second switch SW2 has been turned OFF, then the process proceeds to step S14 after finishing the sequential shootings, and otherwise the process returns to step S10 and the operations of steps S10 to S13 are repeated.

Figure 10:
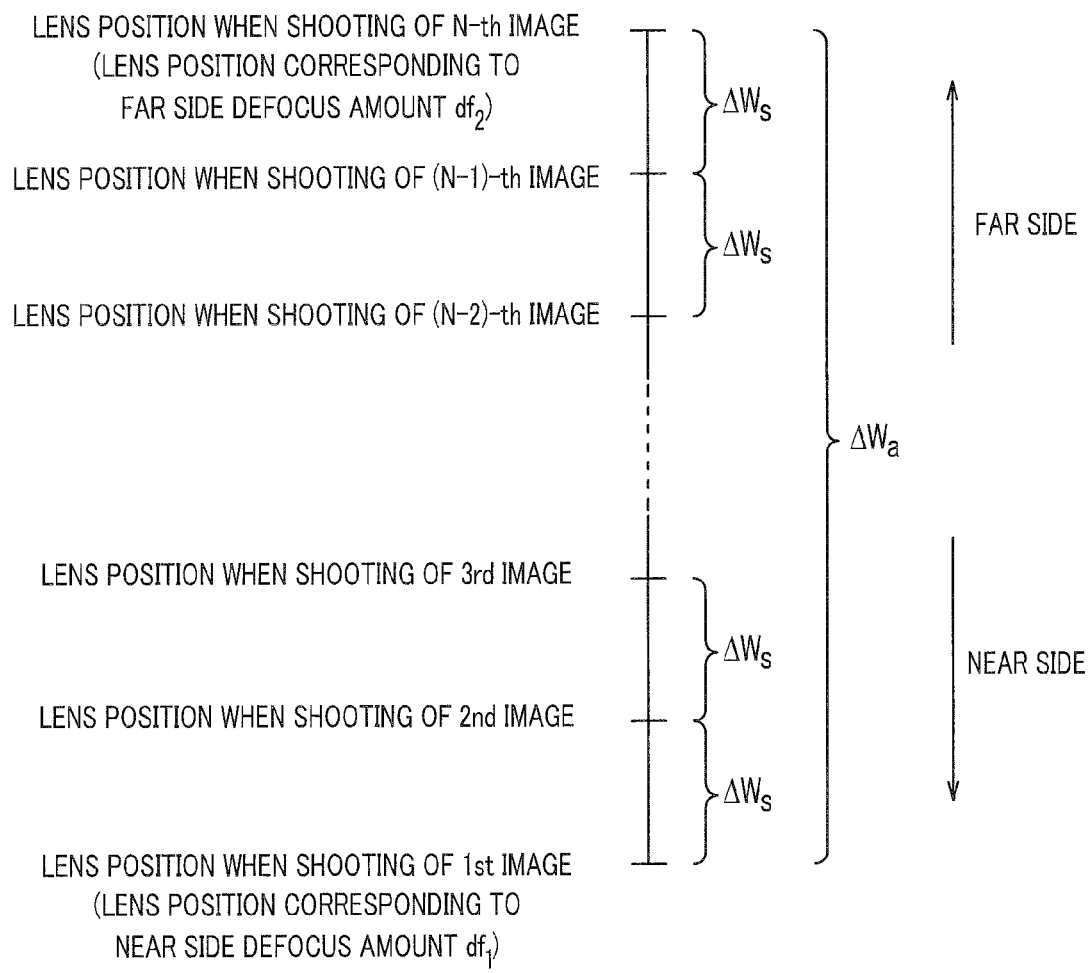
FIG. 10 is a view for explaining a focus bracketing shooting according to the present embodiment.

The focus bracketing shooting according to the present embodiment is performed through repeating the operations of steps S10 to 813. Hereinafter, a specific flow in the focus bracketing shooting according to the present embodiment will be described with reference to FIG. 10. FIG. 10 is a view for explaining about the focus bracketing shooting according to the present embodiment. At first in step S10, the shooting for the first image is performed by the image pickup device 110 in the condition, as shown in FIG. 10, where the focus lens 212 has moved to the lens position corresponding to the near side defocus amount $df_1$ in accordance with the near side driving amount $\Delta W_1$.

Next, in the case that the shootings of the number N determined in step S7 of images to be sequentially shot has not been completed ("No" in step S11), the process proceeds to step S12 and the focus lens 212 is moved toward the far side by the driving amount $W_s$ determined in step 87. Then, in the case that the second switch SW2 has not been turned OFF ("No" in step S13), the process returns to step S10 and the shooting for the second image is performed by the image pickup device 110. In the same manner as the above, the moving (step 812) of the focus lens 212 based on the driving amount $\Delta W_s$ and the shooting (step S10) is repeated, and then the sequential shootings are finished and the process proceeds to step S14 when the shootings of the number N has been completed ("Yes" in step S11). Herein, as shown in FIG. 10, the N-th image is to be an image obtained after the movement to the lens position depending on the far side defocus amount $df_2$, and therefore the focus lens 212 in this situation has been moved just by the total driving amount $\Delta W_a$ from the position where the shooting of the first image had been performed.

In step S14, it is determined whether or not in accordance with the selection by the photographer using the operation board 140, to perform an image synthesis for the plurality of the shot images obtained through the focus bracketing shooting in steps S10 to S13. It is to be noted that the process may be configured such that a photographer preliminarily sets before shooting whether or not to perform the image synthesis for the plurality of the shot images, or alternatively such that a photographer selects after shooting whether or not to perform the image synthesis. If it has been set by a photographer to perform the image synthesis, then the process proceeds to step 515, and otherwise the process proceeds to step S16.

Figure 11:
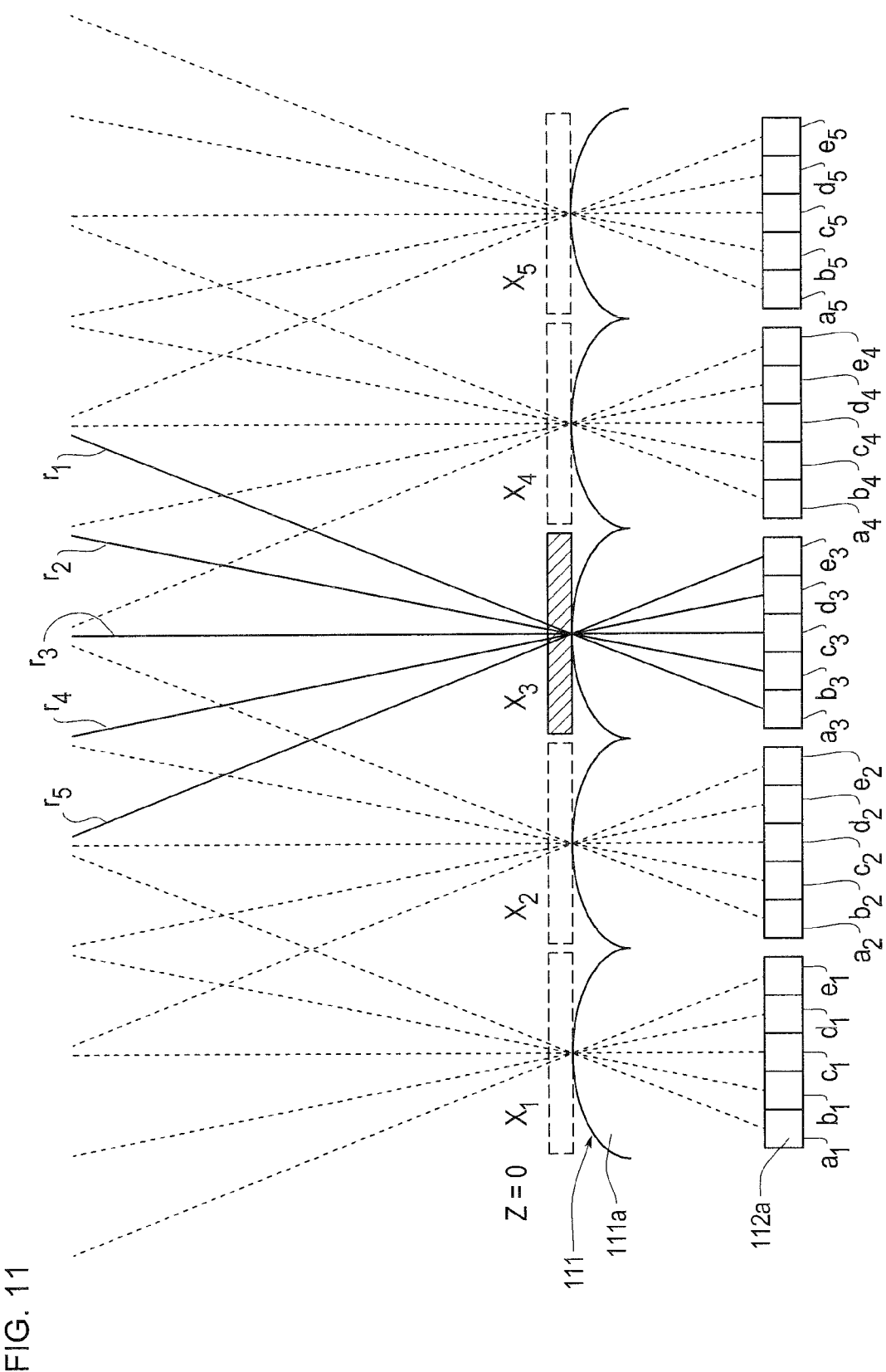
FIG. 11 is a view for explaining an example of a synthesis method when an image plane corresponding to a position where a subject exists is located at a certain plane (Z=0)
Figure 12:
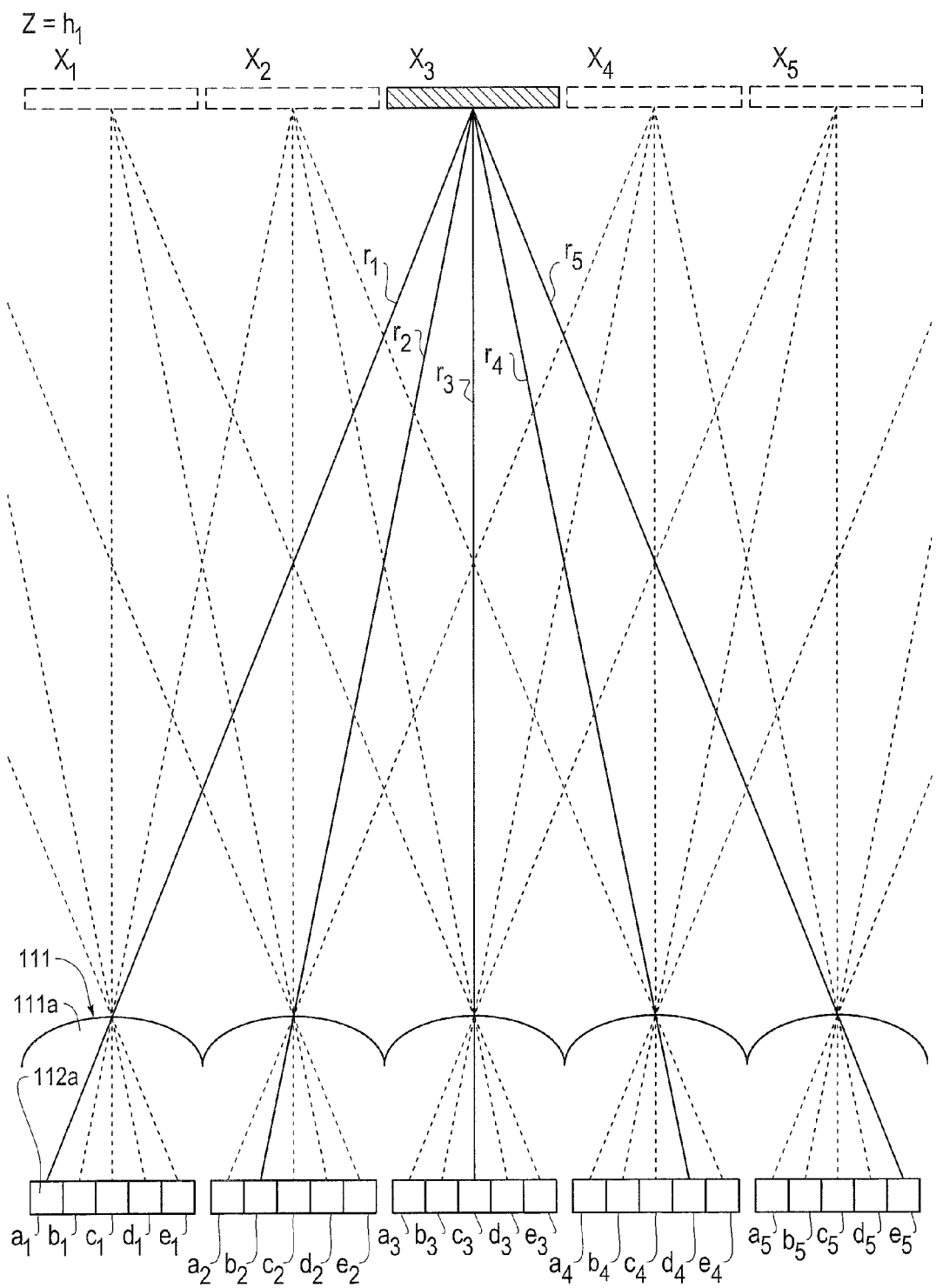
FIG. 12 is a view for explaining an example of a synthesis method when an image plane corresponding to a position where a subject exists is located at an another certain plane ($Z=h_1$)
Figure 13:
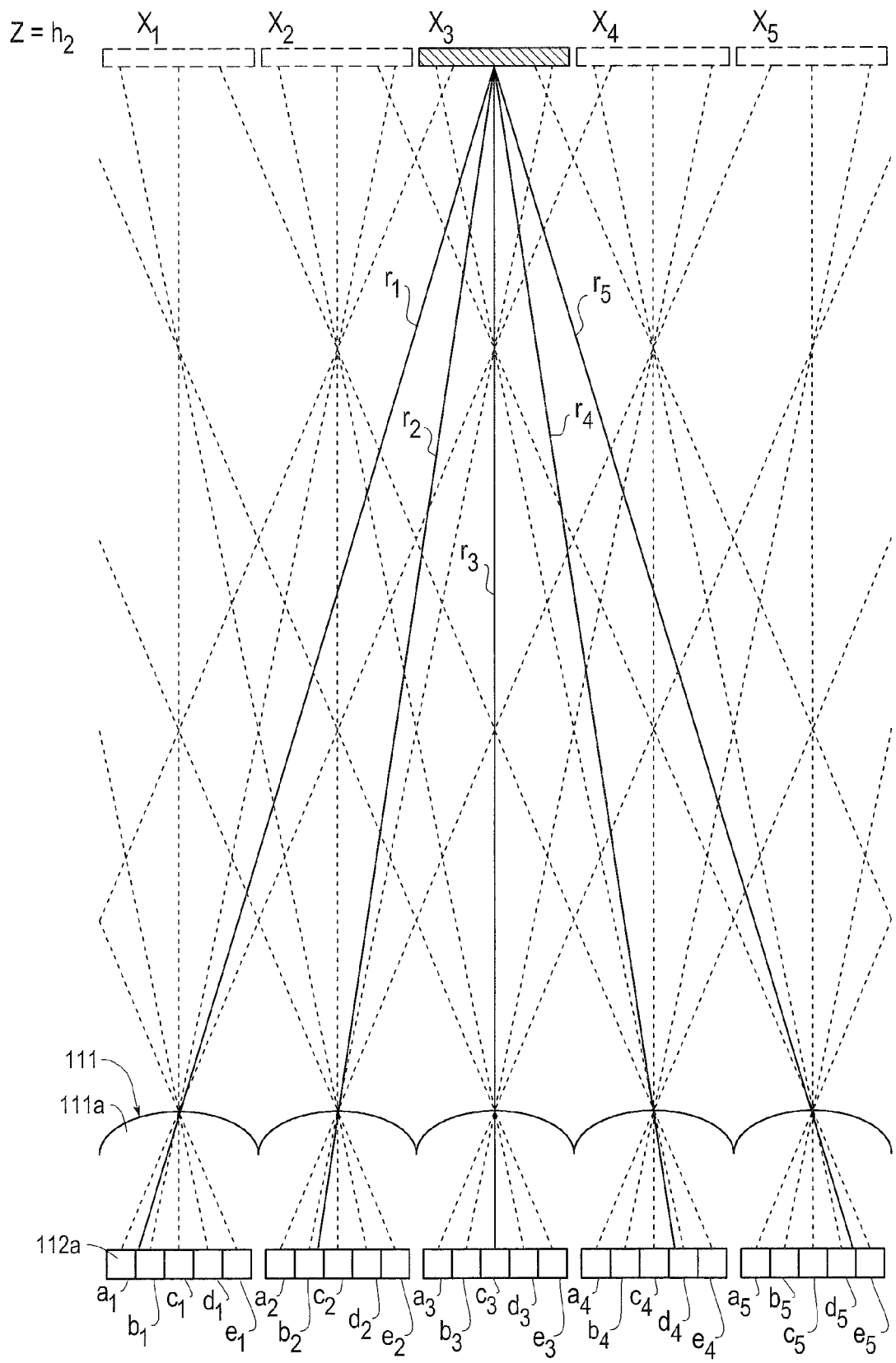
FIG. 13 is a view for explaining an example of a synthesis method when an image plane corresponding to a position where a subject exists is located at a still another certain plane ($Z=h_2$).

In step S15, the camera controller 160 performs the image synthesis for the plurality of the shot images saved in the memory 170 based on the data of the defocus amounts df at the plurality of positions corresponding to the focus detecting areas AFP calculated in the defocus calculator 152 and the driving amount $\Delta W_S$ of the focus lens 212. Hereinafter, examples of the synthesis method for the shot images according to the present embodiment will be described with reference to FIGS. 11 to 13. FIGS. 11 to 13 are views each for explaining an example of the synthesis method for shot images according to the present embodiment.

Described at first hereinafter is the case, as shown in FIG. 11, where a subject intended to be image-synthesized is present at a position of Z=0 provided that the height of image plane from the micro lens array 111 (or distance from the micro lens array 111) is given by Z. Illustrated in FIG. 11 is each light ray (only principal light ray passing through the center of each micro lens 111a forming the micro lens array 111) incident to each of five photoelectric conversion elements 112a out of the photoelectric conversion elements 112a forming each photoelectric conversion element array 112.

In order for each photoelectric conversion element 112a to be identified in FIG. 11, respective photoelectric conversion elements (picture elements) 112a are indicated by $a_1$ to $e_1$, $a_2$ to $e_2$, $a_3$ to $e_3$, $a_4$ to $e_4$, and $a_5$ to $e_5$, and out of respective coordinates $X_1$, $X_2$, $X_3$, $X_4$, and $X_5$ at the height of image plane Z=0, exit light beams from $X_3$ (light rays $r_1$, $r_2$, $r_3$, $r_4$, and $r_5$) are indicated by solid lines, and other exit light beams from $X_1$, $X_2$, $X_4$, and $X_5$ are indicated by dotted lines (hereinafter similar in FIGS. 12 and 13).

As shown in FIG. 11, exit light beams (light rays $r_1$, $r_2$, $r_3$, $r_4$, and $r_5$) from the coordinate $X_3$ at the height of image plane Z=0 are incident respectively to the picture elements $a_3$, $b_3$, $c_3$, $d_3$, and $e_3$. Therefore, there may be obtained a pixel value $L(Z=0, X_3)$ at the height of image plane Z=0 and the coordinate $X_3$ by combining outputs from these picture elements $a_3$, $b_3$, $c_3$, $d_3$, and $e_3$ (refer to the following equation (1)).

$$L(Z=0, X_3)=\text{Out}(a_3)+\text{Out}(b_3)+\text{Out}(c_3)+\text{Out}(d_3)+\text{Out}(e_3) \quad (1)$$

There may also be obtained a pixel value $L(Z=0, X_4)$ at the coordinate $X_4$ adjacent to the coordinate $X_3$ in accordance with the following equation (2).

$$L(Z=0, X_4)=\text{Out}(a_4)+\text{Out}(b_4)+\text{Out}(c_4)+\text{Out}(d_4)+\text{Out}(e_4) \quad (2)$$

Accordingly, there may be arbitrarily obtained a pixel value $L(Z=0, X_i)$ at a given coordinate $X_i$ in accordance with the following equation (3).

$$L(Z=0, X_i)=\text{Out}(a_i)+\text{Out}(b_i)+\text{Out}(c_i)+\text{Out}(d_i)+\text{Out}(e_i) \quad (3)$$

It is to be noted that the above equation (3) may be employed when the designated aperture value by a user is an open value (maximum aperture size). If the designated aperture value by a user is maximum (minimum aperture size), then the following equation (4) may be employed in place of the above equation (3) because it is enough that the light beams comprising light rays $r_1$, $r_2$, $r_3$, $r_4$, and $r_5$ are restricted to the light beam consisting only of light ray $r_3$ (similar in FIGS. 12 and 13 to be described later).

$$L(Z=0, X_i)=\text{Out}(c_i) \quad (4)$$

Also, if the designated aperture value by a user is an intermediate value (aperture size being intermediate between the maximum and the minimum thereof), then the following equation (5) may be employed in place of the above equation (3) because it is enough that the light beams comprising light rays $r_1$, $r_2$, $r_3$, $r_4$, and $r_5$ are restricted to the light beams consisting only of light rays $r_2$, $r_3$, and $r_4$ (similar in FIGS. 12 and 13 to be described later).

$$L(Z=0, X_i)=\text{Out}(b_i)+\text{Out}(c_i)+\text{Out}(d_i) \quad (5)$$

Although the above description takes particular note for five picture elements $a_3$, $b_3$, $c_3$, $d_3$, and $e_3$ arranged in a certain direction and output values thereof are added together, it should be required actually that outputs from 25 picture elements arranged in two dimensions are added together (similar in FIGS. 12 and 13 to be described later).

Described next hereinafter is the case, as shown in FIG. 12, that a subject intended to be image-synthesized is present at a position of the height of image plane $Z=h_1$. As shown in FIG. 12, different from the case of FIG. 11, exit light beams (light rays $r_1$, $r_2$, $r_3$, $r_4$, and $r_5$) from the coordinate $X_3$ at the height of image plane $Z=h_1$ are incident respectively to the picture elements $a_1$, $b_2$, $c_3$, $d_4$, and $e_5$. Therefore, there may be obtained a pixel value $L(Z=h_1, X_3)$ at the height of image plane $Z=h_1$ and the coordinate $X_3$ by combining outputs from these picture elements $a_1$, $b_2$, $c_3$, $d_4$, and $e_5$ (refer to the following equation (6)).

$$L(Z=h_1, X_3)=\text{Out}(a_1)+\text{Out}(b_2)+\text{Out}(c_3)+\text{Out}(d_4)+\text{Out}(e_5) \quad (6)$$

Then, described hereinafter is the case, as shown in FIG. 13, that a subject intended to be image-synthesized is present at a position of the height of image plane $Z=h_2$. As shown in FIG. 13, different from the cases of FIGS. 11 and 12, exit light beams (light rays $r_1$, $r_2$, $r_3$, $r_4$, and $r_5$) from the coordinate $X_3$ at the height of image plane $Z=h_2$ are incident across to a plurality of the picture elements. More specifically, as shown in FIG. 13, light rays $r_1$ is incident across to the photoelectric conversion elements $a_1$ and $b_1$, light rays $r_2$ is incident across to the photoelectric conversion elements $b_2$ and $c_2$, light rays $r_4$ is incident across to the photoelectric conversion elements $c_4$ and $d_4$, and light rays $r_5$ is incident across to the picture elements $d_5$ and $e_5$. Herein, light ray $r_3$ is incident only to the picture element $c_3$ as shown in FIG. 13. Thus, regarding the right ray $r_1$, a light quantity of the right ray $r_1$ may be obtained on the basis of the weighted sum of an output value $\text{Out}(a_1)$ from the picture element $a_1$ and an output value $\text{Out}(b_1)$ from the picture element $b_1$ (refer to the following expression (7)). In the expression (7), $w_{11}$ and $w_{12}$ represent weighting coefficients to be determined depending on the height Z of image plane from the micro lens array 111.

$$\text{Out}(a_1) \times w_{11} + \text{Out}(b_1) \times w_{12} \quad (7)$$

Similarly, light quantities of the light rays $r_2$, $r_4$, and $r_5$ can be obtained on the basis of the weighted sum thereof. Therefore, there can be obtained a pixel value $L(Z=h_2, X_3)$ at the height of image plane $Z=h_2$ and the coordinate $X_3$ in accordance with the following equation (8). In the equation (8), $w_{21}$, $w_{22}$, $W_{41}$, $W_{42}$, $w_{51}$, and $w_{52}$ represent weighting coefficients to be determined depending on the height Z of image plane from the micro lens array 111.

$$L(Z=h_2, X_3)=[\text{Out}(a_1) \times w_{11}+\text{Out}(b_1) \times w_{12}]+[\text{Out}(b_2) \times w_{21}+\text{Out}(c_2) \times w_{22}]+\text{Out}(c_3)+[\text{Out}(c_4) \times w_{41}+\text{Out}(d_4) \times w_{42}]+[\text{Out}(d_5) \times w_{51}+\text{Out}(e_5) \times w_{52}] \quad (8)$$

As described above, according to the present embodiment, the position Z of image plane where a subject intended to be image-synthesized is present becomes to determine the photoelectric conversion elements 112a to which the light beam from the subject is incident and the values of the weighting coefficients required for the image synthesis. In addition, the position Z of image plane where a subject intended to be image-synthesized is present can be obtained in accordance with the defocus amounts df at the plurality of positions respectively depending on the focus detecting areas AFP calculated in the defocus calculator 152. Therefore, according to the present embodiment, an image can be synthesized from the plurality of the shot images saved in the memory 170 based on the data of the defocus amounts df at the plurality of positions and the driving amount $\Delta W_s$ of the focus lens 212. Thus obtained synthetic image is stored into the memory 170.

It is to be noted that the information regarding the photoelectric conversion elements 112a to which the light beam from a subject is incident and the values of the weighting coefficients required for the image synthesis may be available for each image plane position Z by providing a structure in which such information has been preliminarily stored in a nonvolatile memory provided with the camera controller 160.

On the other hand, in step S16, images data of the plurality of shot images obtained through the focus bracketing shooting are stored into the memory 170 together with the defocus amounts df relevant to the focus detecting areas AFP calculated by the defocus calculator 152 and the driving amount $\Delta W_s$ of the focus lens 212 without performing the image synthesis because the determination not to synthesize a image has been already obtained in step S14.

According to the present embodiment, the number N of images to be sequentially shot at the time of the focus bracketing shooting and the driving amount $\Delta W_s$ for the focus bracketing shooting are determined with reference to the defocus amounts df, calculated by the defocus calculator 152, at the plurality of positions respectively depending on the focus detecting areas AFP, based on these the focus bracketing shooting is performed through repeating the driving of the focus lens 212 and the shooting for subjects by the image pickup device 110, thereby a plurality of shooting images with different focus adjusting positions are sequentially shot, and the image synthesis is performed for the obtained plurality of shot images. Therefore, according to the present embodiment, it is enabled to appropriately obtain an image in focuses on a plurality of subjects in picked up images (for example, all of subjects in picked up images) even if the difference between shooting distances to subjects in picked up images is relatively large.

Note that the embodiment explained above was described for facilitating the understanding of the present invention and was not described for limiting the present invention. Therefore, the elements disclosed in the embodiment include all design changes and equivalents falling under the technical scope of the present invention.

For example, the described example in the above embodiment is such that, at the time of focus bracketing shooting, the focus lens 212 is at first driven (step S8) by the driving amount $\Delta W_1$ depending on the near side defocus amount $df_1$, and the focus bracketing shooting is performed while the focus lens 212 is driven from the near side to the far side (steps S10 to S12). Alternatively, there may be employed a structure in which the focus lens 212 is at first driven (step S8) by the driving amount $\Delta W_2$ depending on the far side defocus amount $df_2$, and the focus bracketing shooting is performed while the focus lens 212 is driven from the far side to the near side (steps S10 to S12).

In addition, at the time of calculating the defocus amounts df at the plurality of positions respectively depending on the focus detecting areas AFP shown in FIG. 4, a recognition process for a specific subject such as human face may be employed. More specifically, there may be provided a structure in which a defocus amount df is calculated for the focus detecting area AFP where the specific subject is recognized, the near side defocus amount $df_1$ and the far side defocus amount $df_2$ are obtained depending on the defocus amount df for the specific subject, and based on these the focus bracketing shooting is performed.

Moreover, although the exemplified herewith is the structure performing the detection and the calculation of the defocus amounts df at the plurality of positions respectively depending on the focus detecting areas AFP as shown in FIG. 4 by using the signal from each photoelectric conversion element 112a included in the image pickup device 110, there may be employed a structure provided with a focus detecting device having a sensor for focus detecting separated from the image pickup device 110. Examples thereof include a structure having a total reflecting mirror provided behind the quick return mirror 120 and extracting a part of light beam from the shooting optical system by reflection at the total reflecting mirror, thereby introducing the extracted light beam to the focus detecting device.

What is claimed is:

1. An imaging apparatus comprising:
   a light receiving element having a micro lens array provided with a plurality of micro lenses arranged two-dimensionally, and a plurality of photoelectric conversion elements provided for the plurality of micro lenses, and outputting a light receiving signal obtained by receiving a light beam from an optical system via the micro lens array;
   a detector that detects a shift amount of image plane by the optical system for a plurality of focus detecting positions set at a plurality of positions in the image plane by the optical system; and
   a controller that determines a focus adjusting range for the optical system based on a difference between a first shift amount corresponding to a nearest view side with respect to the optical system and a second shift amount corresponding to a farthest view side with respect to the optical system out of shift amounts respectively detected for the plurality of the focus detecting positions, and obtains the light receiving signal at each of different positions within the focus adjusting range with the light receiving element.

2. The imaging apparatus according to claim 1, wherein the controller determines the different positions in accordance with a range of the image plane where an image based on the light receiving signal is enabled to be produced and the focus adjusting range based on the shift amount.

3. The imaging apparatus according to claim 2, wherein the range of the image plane where the image is enabled to be produced is determined based on each effective diameter of the micro lenses and each size of the photoelectric conversion elements.

4. The imaging apparatus according to claim4, claim 1 wherein
   the controller determines the focus adjusting range for the optical system such that a range of the difference between the first shift amount and the second shift amount is included in a range obtained by continuously cascading, at the different positions, ranges of the image plane where an image based on the light receiving signal is enabled to be produced.

5. The imaging apparatus according to claim 1, further comprising a recognition device that recognizes an image of a specific subject from an image by the optical system, wherein
   the controller determines the focus adjusting range based on the shift amount detected for a focus detecting position corresponding to the image recognized by the recognition device out of the plurality of the focus detecting positions.

6. The imaging apparatus according to claim 1, further comprising a synthesizer that synthesizes an image at a specific image plane by the optical system based on the light receiving signal.

7. The imaging apparatus according to claim 1, further comprising a memory that memorizes the shift amount together with the light receiving signal relevant thereto.

8. The imaging apparatus according to claim 1, wherein the detector detects the shift amount of the image plane by the optical system based on the light receiving signal.

9. An image synthesis method comprising:
detecting a shift amount of image plane by an optical system for a plurality of focus detecting positions set at a plurality of positions in the image plane by the optical system;
determining a focus adjusting range for the optical system based on a difference between a first shift amount corresponding to a nearest view side with respect to the optical system and a second shift amount corresponding to a farthest view side with respect to the optical system out of shift amounts respectively detected for the plurality of the focus detecting positions;
generating a light receiving signal by receiving a light beam from the optical system at a plurality of focus adjusting positions within the focus adjusting range with a plurality of photoelectric conversion elements which is provided for a micro lens array having a plurality of micro lenses arranged two-dimensionally, the light beam passing through the micro lens array; and
synthesizing an image at a specific image plane by the optical system corresponding to the focus adjusting range based on the light receiving signal.

* * * * *